(12) United States Patent
Mankovitz

(10) Patent No.: US 6,987,842 B1
(45) Date of Patent: Jan. 17, 2006

(54) ELECTRONIC TELEVISION PROGRAM GUIDE DELIVERY SYSTEM USING TELEPHONE NETWORK IDLE TIME

(76) Inventor: Roy J. Mankovitz, 24236 Park Granada, Calabasas, CA (US) 91302

( * ) Notice: Subject to any disclaimer, the term of this patent is extended or adjusted under 35 U.S.C. 154(b) by 756 days.

(21) Appl. No.: 09/677,424

(22) Filed: Oct. 2, 2000

Related U.S. Application Data

(60) Provisional application No. 60/157,571, filed on Oct. 4, 1999.

(51) Int. Cl.
 H04M 11/00 (2006.01)
 H04J 1/02 (2006.01)
 H04J 1/00 (2006.01)

(52) U.S. Cl. .............................. 379/93.09; 379/93.14; 379/93.01; 370/490; 370/493

(58) Field of Classification Search .............. 370/463, 370/485, 486, 487, 522; 725/39, 40, 41, 725/42, 43, 44, 45, 46, 47, 48, 49, 50, 51, 725/52, 53, 54, 55, 56; 379/90.01, 93.01, 379/93.09, 102.3; 348/563
See application file for complete search history.

(56) References Cited

U.S. PATENT DOCUMENTS

| | | | | |
|---|---|---|---|---|
| 5,353,337 A | * | 10/1994 | Tsumura et al. | 379/93.08 |
| 5,357,505 A | * | 10/1994 | Tsumura et al. | 370/468 |
| 5,625,416 A | * | 4/1997 | Tseng et al. | 348/388.1 |
| 5,635,978 A | * | 6/1997 | Alten et al. | 725/42 |
| 5,657,072 A | | 8/1997 | Aristides et al. | 348/13 |
| 5,666,645 A | * | 9/1997 | Thomas et al. | 725/47 |
| 5,805,154 A | * | 9/1998 | Brown | 345/717 |
| 5,872,837 A | * | 2/1999 | Johnson | 379/93.27 |
| 6,029,064 A | * | 2/2000 | Farris et al. | 455/412.2 |
| 6,137,549 A | * | 10/2000 | Rasson et al. | 725/37 |
| 6,323,911 B1 | * | 11/2001 | Schein et al. | 348/552 |
| 6,442,755 B1 | * | 8/2002 | Lemmons et al. | 725/47 |
| 6,481,011 B1 | * | 11/2002 | Lemmons | 725/47 |
| 6,604,240 B2 | * | 8/2003 | Ellis et al. | 725/45 |
| 6,675,385 B1 | * | 1/2004 | Wang | 725/39 |

* cited by examiner

Primary Examiner—Hanh Nguyen
(74) Attorney, Agent, or Firm—Gifford, Krass, Groh, Sprinkle, Anderson & Citkowski, PC

(57) ABSTRACT

A system is disclosed for delivering information, preferably electronic television program guide information, to a user over a telecommunications network. The network includes the capability of determining whether the user's connection to the network is in an on-hook or off-hook condition, and the information is received and stored at a user site when the user's connection to the network is in an on-hook condition. Information is delivered from a guide provider to a phone company switch point over a land-based or wireless dedicated line. When the user's phone is on-hook, the guide data is sent to the user site through a splitter. The line splitter provides the signal to a data decoder circuit, the output of which is connected to a data input terminal in communication with a television receiver, VCR, cable box, or other piece of equipment for displaying the program guide data on a screen. The invention is capable of delivering complete program guide data to a user in spite of data interruptions due to telephone calls. The program schedule data is preferably transmitted as n serial packets of information, and the sequence of packets is repeated several times each day.

20 Claims, 2 Drawing Sheets

ELECTRONIC TELEVISION PROGRAM GUIDE DELIVERY SYSTEM USING TELEPHONE NETWORK IDLE TIME

REFERENCE TO RELATED APPLICATION

This application claims priority from U.S. provisional patent application Ser. No. 60/157,571, filed Oct. 4, 1999, the entire contents of which are incorporated herein by reference.

FIELD OF THE INVENTION

This invention relates generally to information delivery and, in particular, to an electronic television program guide delivery system using telephone network idle time.

BACKGROUND OF THE INVENTION

Various systems have been implemented or proposed for delivering electronic television program guides (EPOs) to viewer locations. Such approaches include use of the vertical blanking interval (VBI) portion of a broadcast television station signal, use of a paging network, and through dial-up telephone. Each of these methods presents shortcomings. VBI access may be controlled by cable companies which may place restrictions on such transmissions. Paging receivers and paging airtime are relatively expensive, and dial-up telephone service ties up the user's telephone and requires potentially large telephone switching equipment resources.

In the field of telephone communications, connections are typically made through the switching system of a telephone exchange and a user's telephone through the medium of a telephone network. When the telephone receiver is lifted off the hook, a loop is formed between the telephone and the exchange's switching system by way of the telephone network, and voice communication is made possible by the transmission of signals around the loop.

As disclosed in Tsumura et al. U.S. Pat. Nos. 5,353,337 and 5,357,505, there are known communications devices which make use of a network's idle time for the unidirectional transmission of broadcast data in the form of, for example, music data to the user's home. This type of communication device calls for the installation in a telephone exchange of an exchange device which is used to switch the telephone network selectively between the switching system-of the exchange itself and a facility installed in an independent center for the transmission of analog data in the form of speech or music. Each user's home is fitted with a home device with a speaker which is connected to the telephone network and which, when the receiver is lifted off the hook, connects the exchange device to the exchange's switching system itself to enable voice communication and, when the receiver is placed on the hook, switches the exchange device to the independent center from which broadcast data is transmitted by way of the telephone network to user's home devices.

SUMMARY OF THE INVENTION

This invention provides methods and apparatus for delivering information, preferably electronic television program guide information, to a user over a telecommunications network. The network includes the capability of determining whether the user's connection to the network is in an on-hook or off-hook condition, and the information is received and stored at a user site when the user's connection to the network is in an on-hook condition.

In the preferred embodiment, the information is delivered from a guide provider to a phone company switch point over a land-based or wireless dedicated line. When the user's phone is on-hook, the guide data is sent to the user site through a splitter. The line splitter provides the signal to a data decoder circuit, the output of which is connected to a data input terminal in communication with a television receiver, VCR, cable box, or other piece of equipment for displaying the program guide data on a screen.

The invention is capable of delivering complete program guide data to a user in spite of data interruptions due to telephone calls. The program schedule data is preferably transmitted as n serial packets of information, and the sequence of packets is repeated several times each day. Interspersed between the schedule data is channel mapping data which is also repetitively broadcast each day. In the event of an on-hook data interruption from an off-hook incoming/outgoing call, incomplete packet reception will be detected by a memory management system storage will cease until the phone is again on-hook. At this time, data storage will continue, and incomplete and missing packets will be picked up in the subsequent repetitive broadcasts of the schedule data.

DETAILED DESCRIPTION OF THE INVENTION

Figure 1:
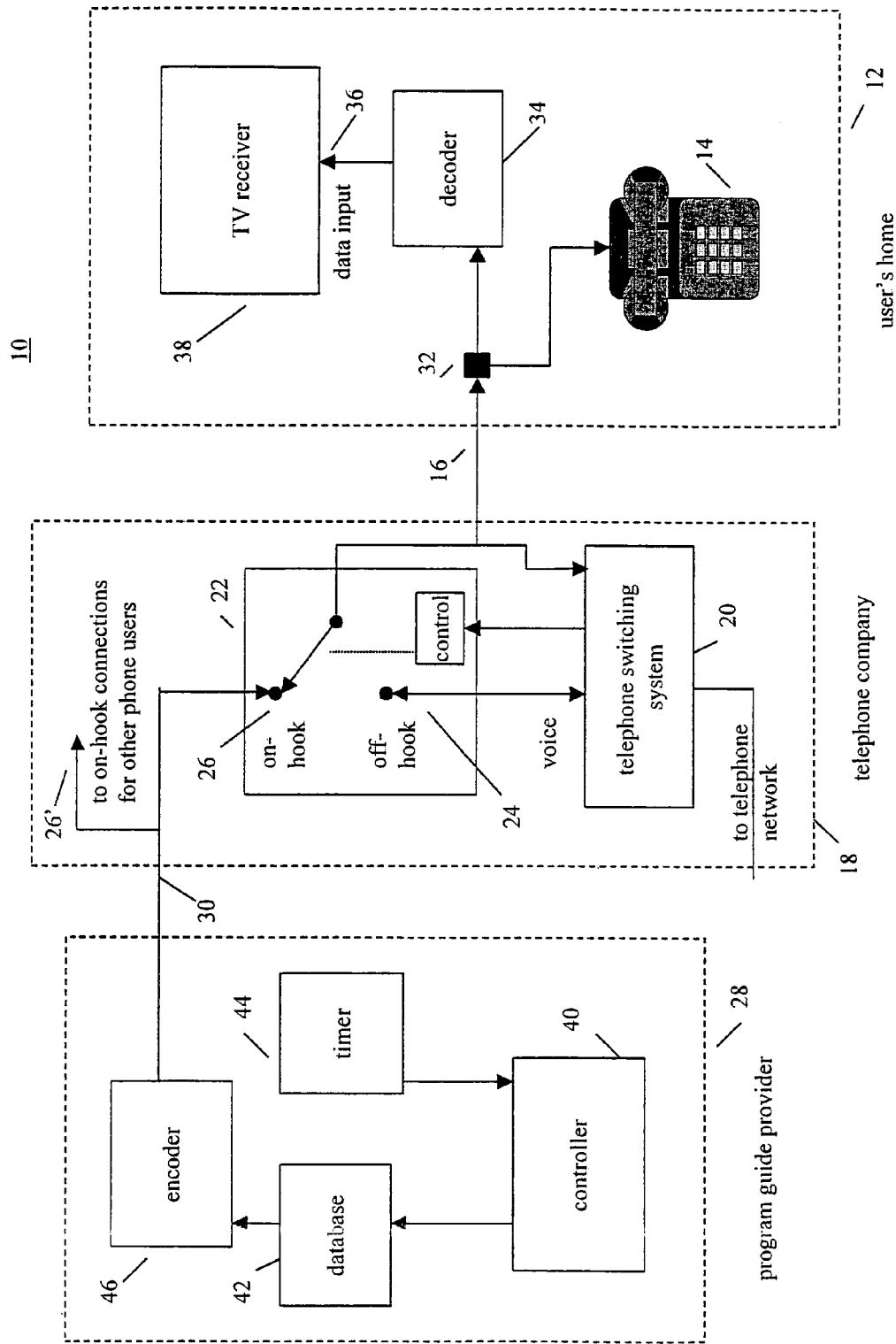
FIG. 1 is a block diagram of an embodiment of the invention showing how an electronic program guide can be downloaded to a user location during telephone network idle time.

Referring to FIG. 1, there is shown a block diagram of one embodiment 10 of the invention, showing how an electronic program guide can be downloaded to a user's home using the idle time of the telephone network. At the user's home 12 is a conventional telephone 14 connected via line 16 to a local phone company switching center 18. A switching system 20 detects whether the phone 14 is on or off-hook, and provides a control signal to a line switch 22 which connects the line 16 to the conventional voice telecommunications service at switch point 24 whenever the phone 14 is off-hook, and to an alternate switch point 26 whenever the phone 14 is on-hook. This type of switching arrangement is well known to those in the art and is used by telephone companies to send on-hook signals to user's phone systems, such as message waiting reset signals, diagnostic signals, etc.

In the present invention, electronic television program guide data is provided from a guide provider 28 to the phone company switch point 26 via a line 30, which may be a land or wireless dedicated line. Thus, when the user's phone 14 is on-hook, the guide data is sent to the user's home on line 16. A two-way splitter 32 provides the signal on line 16 to a data decoder circuit 34, the output of which is connected to a data input terminal 36 of a television receiver 38, which may be a VCR, a cable box, or a television display unit for displaying the program guide data on a screen.

One significant problem with the system described above is the fact that the stream of guide data being furnished to the home in the on-hook condition is interrupted each time the phone is taken off-hook, which occurs whenever there is an incoming or outgoing call to or from the user. Therefore, provisions must be made to enable the user to capture the necessary guide data in spite of such data interruptions. This is accomplished as follows.

Figure 2:
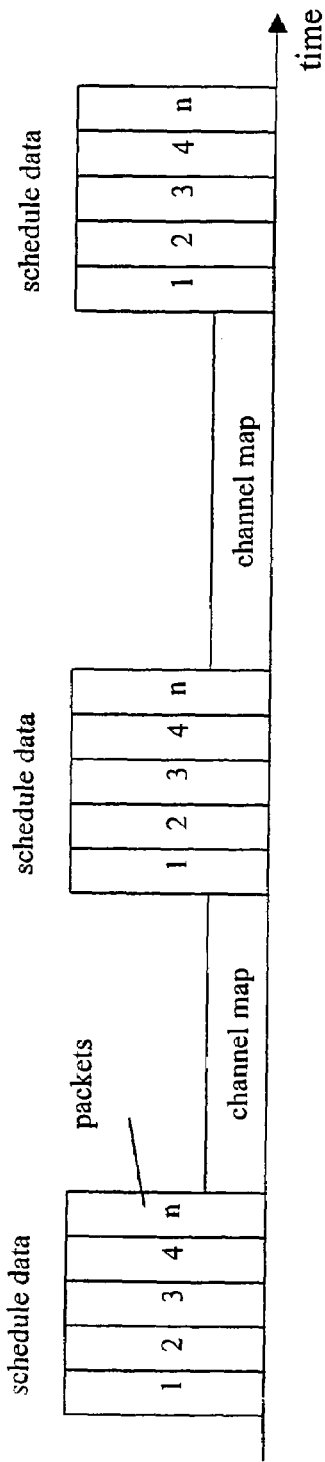
FIG. 2 is an example of signals provided from a program guide provider to a phone company as a function of time.

The data provider system 28 includes a controller 40, a digital database 42, timer circuits 44, and a data encoder 46. The database 42 contains the program guide data for a predetermined time period, and is automatically updated as required to keep it current. The timer 44 is set to program the controller 40 to periodically and repetitively instruct the database to output the guide data to the encoder 46. The encoder 46 converts the database output into a signal compatible with the telephone system data transmission requirements, such as an audio modulated signal well known to those in the art. FIG. 2 is an example of the signals provided from the guide provider 28 on the line 30 to the phone company as a function of time.

The program schedule data is preferably transmitted as n serial packets of information, and the sequence of packets is repeated several times each day. Interspersed between the schedule data is channel mapping data which is also repetitively broadcast each day. Such packetized redundant broadcast systems are well known in the art, such as described in U.S. Pat. No. 5,619,274, and as used to broadcast the StarSight and Guide Plus branded program guides in the vertical blanking interval of broadcast signals in the U.S.

Figure 3:
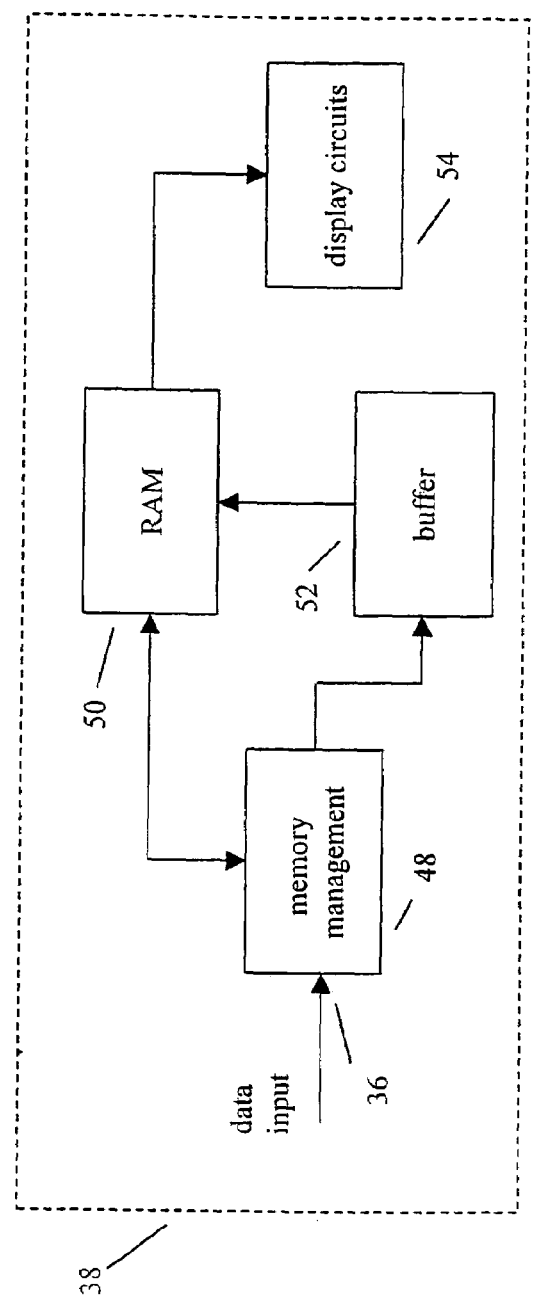
FIG. 3 is a drawing which shows a TV receiver equipped with a memory management system to receive packetized data and a packet buffer for temporarily storing the packets.

As shown in FIG. 3, the TV receiver 38 is equipped with a memory management system 48 which receives the packetized data on line 36 and temporarily stores the packets in the packet buffer 52. The temporarily stored packets are analyzed for data errors, time priority codes, and other criteria to determine if they are to be shifted to RAM 50, which holds the program guide data to be displayed to the user using the display circuits 54. Only complete, error-free, and timely packets are stored in RAM, and replace out-dated packets therein using any of a multitude of memory management criteria.

From the above description, it can be seen that the system 10 is capable of delivering complete program guide data to a user in spite of data interruptions due to telephone calls. In the event of an on-hook data interruption from an off-hook incoming/outgoing call, guide data packet transmission will be interrupted, incomplete packet reception will be detected by the memory management system 48, and data storage into RAM will cease until the phone 14 is again on-hook. At this time, data storage will continue, and incomplete and missing packets will be picked up in the subsequent repetitive broadcasts of the schedule data as shown in FIG. 2. Because most home users of telephones rarely have such phones off-hook during the late night/early morning hours, it is anticipated that there will be more than adequate on-hook time for the receiver 38 to acquire the complete schedule data each day, or multiples thereof.

The data input terminal 36 described above is similar to the RS-232 data input terminals, usually referred to as G-Link inputs, provided on television receivers equipped with the Guide Plus program guide system in the U.S. and designed to receive serial program guide data, such as the G-Link connector provided on the Sony Model SLV-M20HF VCR. The decoder 34 is designed to convert the analog on-hook data signal on line 16 to a serial digital data signal compatible with the input requirements of the receiver 38, and to filter out voice/data signals appearing on line 16 in off-hook conditions. In many instances, the program guide data is encrypted using a time-dependent code. It is anticipated that the current time and day information may be provided to the decoder 34 by the phone system 18 using the current methods of transmitting such time data to users receiving caller ID information whenever incoming calls are received.

While the system of FIG. 1 shows the connections for a single user, it is contemplated that the signal delivered to the phone company 18 on the line 30 will be similarly applied to the on-hook switch points 26' of numerous users who are subscribers of that company, so that the guide data can be received by large groups of users using the idle time of each user's phone line for delivery.

I claim:

1. A method of providing electronic television program guide information to a user over a telecommunications network including the capability of determining whether the user's connection to the network is in an on-hook or off-hook condition, the method comprising the steps of:
   storing television program guide information at a provider site on the network;
   repetitively transmitting the information over the network regardless of whether the user's connection to the network is in an on-hook or off-hook condition;
   receiving at least a portion of the information at a user site when the user's connection to the network is in an on-hook condition;
   storing the received information at the user site; and
   updating the information as it is received.

2. The method of claim 1, further including the step of displaying the information at the user site.

3. The method of claim 1, further including the steps of:
   encoding the information at the provider site prior to transmitting; and
   decoding the information at the user site.

4. The method of claim 1, further including the step of simultaneously transmitting the information to a plurality of user sites.

5. The method of claim 1, wherein the step of delivering the information to a user site over the network in wireless fashion.

6. The method of claim 1, including the step of repeating the transmission of the information to maximize the amount of information delivered to the user in the event of an off-hook or other network interruption.

7. The method of claim 1, including the steps of:
   transmitting the information in the form of serial data packets; and
   reconstructing the packets at the user site.

8. The method of claim 1, including the steps of:
   encrypting the information prior to transmission; and
   decrypting the information at the user site.

9. The method of claim 1, further including the step of filtering out voice or data signals received over the network when the user's connection is in an off-hook condition.

10. A system for providing information to a user in electronic form over a telecommunications network, the network including the capability of determining whether the user's connection to the network is in an on-hook or off-hook condition, the system comprising:
    an information provider including a database for storing the information and an interface enabling requested information to be repetitively delivered over the telecommunications network regardless of whether user's connection to the network is in an on-hook or off-hook condition; and
    a user site including a storage device and a splitter interfaced to the network for routing the information from the provider to the storage device and updating the information when the user's connection to the network is in an on-hook condition.

11. The system of claim 10, wherein the information relates to a television program.

12. The system of claim 11, wherein the information is television program schedule information.

13. The system of claim 12, wherein:
the user site further includes a television display; and
the storage device is interfaced to the television display enabling the user to view the program schedule information.

14. The system of claim 10, wherein:
the information is delivered in encoded form; and
the user site includes a decoder to decode the information.

15. The system of claim 10, further including:
a plurality of user sites, each equipped with a splitter interfaced to the network for receiving the information from the provider.

16. The system of claim 10, wherein at least a portion of the network is wireless.

17. The system of claim 10, wherein the transmission of the information is repeated to maximize the amount of information delivered to the user in the event of an off-hook or other network interruption.

18. The system of claim 17, wherein the information is transmitted in the form of serial data packets which are reconstructed at the user's site.

19. The system of claim 10, further including circuitry to the user's site for filtering out voice or data signals received over the network when the user's connection is in an off-hook conditions.

20. The system of claim 10, wherein the information is encrypted using a time-dependent code.

* * * * *